(12) United States Patent
Gustafsson et al.

(10) Patent No.: US 11,394,484 B2
(45) Date of Patent: Jul. 19, 2022

(54) METHOD AND TRANSMITTING NODE FOR HANDLING TRANSMISSIONS OVER A RADIO CHANNEL

(71) Applicant: Telefonaktiebolaget LM Ericsson (publ), Stockholm (SE)

(72) Inventors: Christer Gustafsson, Huddinge (SE); Anders Ohlsson, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/049,058

(22) PCT Filed: Apr. 20, 2018

(86) PCT No.: PCT/SE2018/050404
§ 371 (c)(1),
(2) Date: Oct. 20, 2020

(87) PCT Pub. No.: WO2019/203705
PCT Pub. Date: Oct. 24, 2019

(65) Prior Publication Data
US 2021/0242959 A1    Aug. 5, 2021

(51) Int. Cl.
*H04W 4/00* (2018.01)
*H04L 1/00* (2006.01)
(Continued)

(52) U.S. Cl.
CPC .............. *H04L 1/0003* (2013.01); *H04L 1/08* (2013.01); *H04W 72/085* (2013.01)

(58) Field of Classification Search
CPC ....... H04L 1/0003; H04L 1/08; H04W 72/085
(Continued)

(56) References Cited

U.S. PATENT DOCUMENTS

2005/0193420 A1*  9/2005  Hocevar ............. H04L 65/1069
                                                                725/74
2006/0089104 A1*  4/2006  Kaikkonen .......... H04B 17/382
                                                                455/67.13
(Continued)

OTHER PUBLICATIONS

International Search Report and Written Opinion issued in International Application No. PCT/SE2018/050404 dated Dec. 20, 2018 (11 pages).
(Continued)

*Primary Examiner* — Chuong T Ho
(74) *Attorney, Agent, or Firm* — Rothwell, Figg, Ernst & Manbeck, P.C.

(57) ABSTRACT

Method and transmitting node (300) for handling transmissions to a receiving node (302) in a first service and in a second service over a radio channel where feedback signaling is employed to indicate either an acknowledgement, ACK, or a non-acknowledgement, NACK, of correct reception at the receiving node. A first Outer Loop Compensation, OLC, is employed in a first link adaptation for the first service and a second OLC is employed in a second link adaptation for the second service. The first OLC is adjusted (3:2) based on feedback (3:1) for transmissions in the first service, while the second OLC is adjusted (3:3) based on feedback for a repeated (3:4A) subset of the transmissions in the first service before the second service has been activated.

20 Claims, 5 Drawing Sheets

(51) Int. Cl.
  *H04L 1/08* (2006.01)
  *H04W 72/08* (2009.01)
(58) Field of Classification Search
  USPC .................................................. 370/329, 330
  See application file for complete search history.

(56) References Cited

U.S. PATENT DOCUMENTS

| 2012/0149429 | A1* | 6/2012 | Martin | ............ | H04W 36/00835 |
| | | | | | 455/525 |
| 2014/0328182 | A1* | 11/2014 | Gao | ...................... | H04W 76/15 |
| | | | | | 370/236 |
| 2015/0139125 | A1 | 5/2015 | Bharadwaj et al. | | |
| 2016/0323899 | A1* | 11/2016 | Arvidson | ............... | H04B 7/024 |

OTHER PUBLICATIONS

Mingxiang Guan et al., "Performance Analysis and Improvement for WCDMA System Outer Loop Power Control", Proceedings of ICCTA2009, Oct. 16, 2009 (pp. 73-77).

* cited by examiner

METHOD AND TRANSMITTING NODE FOR HANDLING TRANSMISSIONS OVER A RADIO CHANNEL

CROSS REFERENCE TO RELATED APPLICATION(S)

This application is a 35 U.S.C. § 371 National Stage of International Patent Application No. PCT/SE2018/050404, filed Apr. 20, 2018, designating the United States.

TECHNICAL FIELD

The present disclosure relates generally to a method and a transmitting node, for handling transmissions to a receiving node in a first type of service and in a second type of service over a radio channel where feedback signaling is employed to indicate either an acknowledgement, ACK, or a non-acknowledgement, NACK, of correct reception of the transmissions.

BACKGROUND

In the field of wireless communication, a transmitting node may need information about whether a transmission has been received and decoded correctly or not by a receiving node, e.g. in order to adjust the transmission for better reception if needed, or to perform retransmission of a failed transmission. This is accomplished by receiving a notification from the receiving node that indicates correct or incorrect reception of a transmission from the transmitting node. For example, such a transmission may comprise a Protocol Data Unit, PDU, a data packet or a transport block, although this disclosure is not limited to these examples.

These notifications, or feedback signaling, are commonly comprised of an acknowledgement, ACK, or a non-acknowledgement, NACK, of correct reception of the transmissions. "Correct reception" (ACK) implies that the receiving node has received the transmission and has also managed to decode it correctly, while NACK implies failed decoding or no reception at all. This ACK/NACK procedure is commonly referred to as a Hybrid Automatic Repeat Request, HARQ, process. The correct or incorrect reception and decoding of a received transmission at the receiving node is typically determined by applying a Cyclic Redundancy Check, CRC, on the received content which is well known in the art.

This disclosure may be applied to a wireless network where signals are transmitted from a transmitting node to a receiving node using Orthogonal Frequency-Division Multiplexing, OFDM. For example, the wireless network may be operating according to Long Term Evolution (LTE) or according to 5G, also referred to as "New Radio" (NR), both being defined by the third Generation Partnership Project, 3GPP.

The term "transmitting node" used herein may refer to a network node such as a base station, eNB or gNB, depending on the terminology used, or to a wireless device, commonly also denoted User Equipment (UE). Similarly, the term "receiving node" used herein may also refer to a network node or a wireless device. For example, when the transmitting node is a network node the receiving node may be a wireless device, and vice versa. Both nodes could also be network nodes or wireless devices. The present disclosure is not limited to any particular types of transmitting and receiving nodes.

To increase the probability of successful decoding of a received packet or transport block, HARQ can be enforced by the so-called soft combining technique. In LTE, a special soft combining method called "incremental redundancy" may be used where the receiving node temporarily stores any erroneously received packet or transport block and combines it with retransmitted replicas of that packet or transport block, as requested by the HARQ feedback. Such replicas contain the same payload data as the original packet or transport block but with different encoding thereby puncturing the encoder output in different ways according to a certain scheme of redundancy versions that depend on the specific retransmission attempt.

A conventional HARQ process in LTE is illustrated in FIG. 1 by two examples when data is communicated between a wireless device 100 and a network node 102 by uplink transmission and by downlink transmission, respectively. When the wireless device 100 performs an uplink transmission of data on the Physical Uplink Shared Channel (PUSCH) as shown in an action 1:1, the network node 102 receives and attempts to decode the transmission in an action 1:2. The uplink HARQ feedback (ACK/NACK) is then transmitted by the network node 102 on the Physical Hybrid-ARQ Indicator Channel (PHICH) channel in an action 1:3.

On the other hand, when the network node 102 performs a downlink transmission of data on the Physical Downlink Shared Channel (PDSCH) as shown in an action 1:4, the wireless device 100 receives and attempts to decode the transmission in an action 1:5. The downlink HARQ feedback (ACK/NACK) is then transmitted by the wireless device 100 on the Physical Uplink Control Channel (PUCCH) in an action 1:6.

The state and condition of a radio channel used for transmission of data between two nodes typically varies, e.g. due to interference from other transmissions and/or movement of either of the nodes. To achieve the best possible performance, link adaptation is employed which basically means that a suitable Transport Block Size, TBS, in combination with a suitable Modulation and Coding Scheme, MCS, are selected depending on the current Signal-to-Noise Ratio, SNR, measured on signals received from the opposite node which may include specific known reference signals which are transmitted with a predefined power. The SNR may also be indicated in a report received from the other node, for example by a Channel Quality Indicator, CQI, reported from the wireless device. The amount of ACKs and NACKs can also be used to evaluate the current radio channel and the MCS used.

In this disclosure, the term SNR implies a ratio where the noise may include any received energy apart from the wanted signal, including interference from other transmissions. The SNR can thus be viewed as equivalent to Signal-to-Noise and Interference Ratio, SINR, although SNR is used herein for simplicity. The currently achieved SNR, herein denoted "actual SNR", at the receiving node can be calculated based on measurements on received signals according to regular procedures. The actual SNR may be used to evaluate a currently employed link adaptation.

A target SNR may be employed as a basis for link adaptation which includes to select an MCS suitable for meeting the target SNR. A target Block Error Rate, BLER, may also be employed as a basis for selecting an MCS that can utilize the current channel conditions for optimal performance while the target BLER is fulfilled. In link adaptation, a so-called outer loop is sometimes employed where the link adaptation is adjusted depending on whether an ACK or a NACK is received. Basically, when an ACK is received, the link adaptation can be made more aggressive and when a NACK is received, the link adaptation should be made more robust.

If the current radio conditions are good and the measured actual SNR is relatively high, an MCS that provides high throughput can be used and still meeting the target SNR and/or target BLER, while if the radio conditions are bad and the achieved SNR is relatively low, an MCS that provides a robust but resource demanding radio channel needs to be used to meet the target SNR and/or target BLER.

Different services may require different throughput and/or quality. For example, a voice service may primarily require high quality and low latency while a data service, e.g. downloading or uploading large amounts of data from or to a server, may require high throughput but less quality. However, it may be a problem to choose an optimal link adaptation and MCS if a mix of different services having different requirements in terms of quality and throughput is employed.

SUMMARY

It is an object of embodiments described herein to address at least some of the problems and issues outlined above. It is possible to achieve this object and others by using a method and a transmitting node as defined in the attached independent claims.

According to one aspect, a method is performed by a transmitting node for handling transmissions to a receiving node in a first service and in a second service over a radio channel where feedback signaling is employed to indicate either an acknowledgement, ACK, or a non-acknowledgement, NACK, of correct reception of the transmissions.

In this method, the transmitting node adjusts a first OLC for the first service, based on feedback signaling from the receiving node for the transmissions in the first service, by increasing the first OLC with a first adding value $\Delta OLC+1$ when an ACK is received and reducing the first OLC with a first reducing value $\Delta OLC-1$ when a NACK is received. The transmitting node then performs a first link adaptation of the radio channel for transmissions in the first service based on an actual SNR of signals in the first service and the adjusted first OLC, and accordingly performs transmissions in the first service over the radio channel using the first link adaptation. The transmitting node further repeats a subset of the transmissions in the first service, e.g. every nth transmission where n is an integer larger than 1.

The transmitting node also adjusts a second OLC for the second service before the second service becomes active, based on feedback signaling from the receiving node for said repeated subset of transmissions, by increasing the second OLC with a second adding value $\Delta OLC+2$ when an ACK is received and reducing the second OLC with a second reducing value $\Delta OLC-2$ when a NACK is received. The transmitting node then performs a second link adaptation of the radio channel for transmissions in the second service based on said actual SNR and the adjusted second OLC, and accordingly performs transmissions in the second service over the radio channel using the second link adaptation, once the second service becomes active.

According to another aspect, a transmitting node is arranged to handle transmissions to a receiving node in a first service and in a second service over a radio channel where feedback signaling is employed to indicate either an acknowledgement, ACK, or a non-acknowledgement, NACK, of correct reception of the transmissions.

The transmitting node is configured to adjust a first OLC for the first service, based on feedback signaling from the receiving node for the transmissions in the first service, by increasing the first OLC with a first adding value $\Delta OLC+1$ when an ACK is received and reducing the first OLC with a first reducing value $\Delta OLC-1$ when a NACK is received. The transmitting node is also configured to perform a first link adaptation of the radio channel for transmissions in the first service based on an actual SNR of signals in the first service and the adjusted first OLC, and to perform transmissions in the first service over the radio channel using the first link adaptation. The transmitting node is further configured to repeat a subset of the transmissions in the first service.

In a corresponding way, the transmitting node is configured to adjust a second OLC for the second service before the second service becomes active, based on feedback signaling from the receiving node for said repeated subset of transmissions, by increasing the second OLC with a second adding value $\Delta OLC+2$ when an ACK is received and reducing the second OLC with a second reducing value $\Delta OLC-2$ when a NACK is received. The transmitting node is also configured to perform a second link adaptation of the radio channel for transmissions in the second service based on said actual SNR and the adjusted second OLC, and to perform transmissions in the second service over the radio channel using the second link adaptation, once the second service becomes active.

Thereby, it is an advantage that different link adaptations can be applied for the first and second services so that different requirements of the services, e.g. in terms of quality and/or throughput or data speed, can be satisfied by selecting a suitable link adaptation, e.g. including an MCS, for each service individually.

The above method and transmitting node may be configured and implemented according to different optional embodiments to accomplish further features and benefits, to be described below.

A computer program is also provided comprising instructions which, when executed on at least one computer in the above receiving node, cause the at least one computer to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to achieve optimal or at least adequate communication performance by link adaptation of a radio channel between a transmitting node and a receiving node, when at least two different services are employed, herein referred to as a first service and a second service. A first Outer Loop Compensation, OLC, is employed in a first link adaptation for transmissions in the first service and a second OLC is employed in a second link adaptation for transmissions in the second service. The first OLC is adjusted based on feedback signaling from the receiving node for transmissions in the first service, while the second OLC is adjusted based on feedback signaling from the receiving node for a repeated subset of the transmissions in the first service before the second service has been activated.

Thereby, the second link adaptation will be prepared and ready for use once the second service becomes activated, and the first and second link adaptations can be more or less optimized individually to meet requirements of the first and second services, respectively. For example, the first link adaptation can be made "robust" by using a relatively high target SNR if the first service is a voice service requiring high quality, while the second link adaptation can be made "aggressive" by using a relatively low target SNR if the second service is a data service requiring high throughput.

Figure 1:
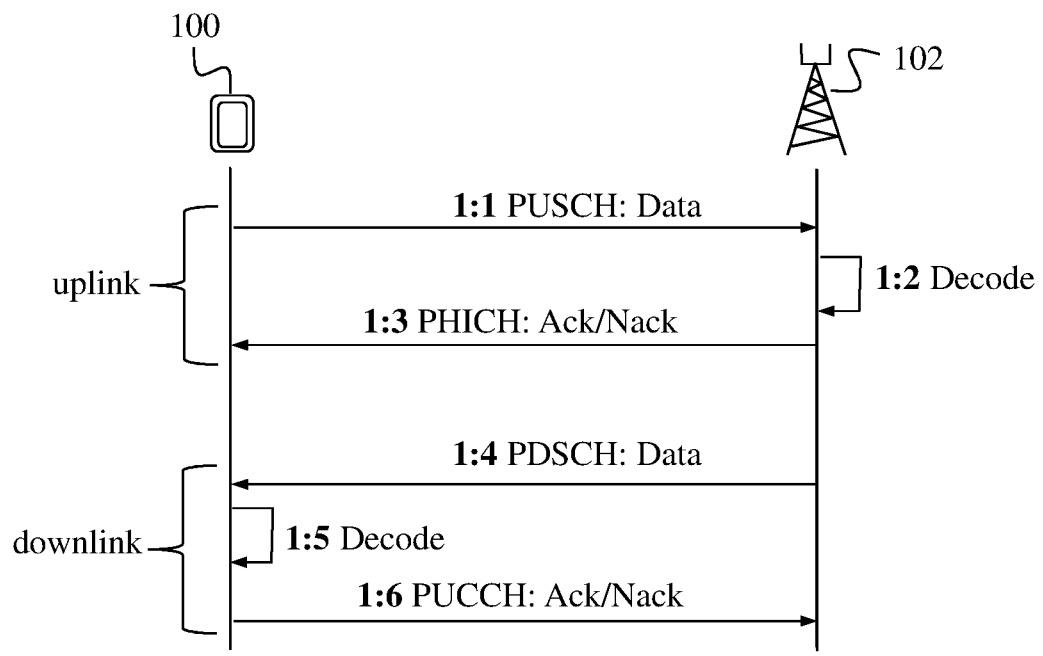
FIG. 1 is a signaling diagram illustrating a HARQ process applied for uplink and downlink communication, according to the prior art.
Figure 2A:
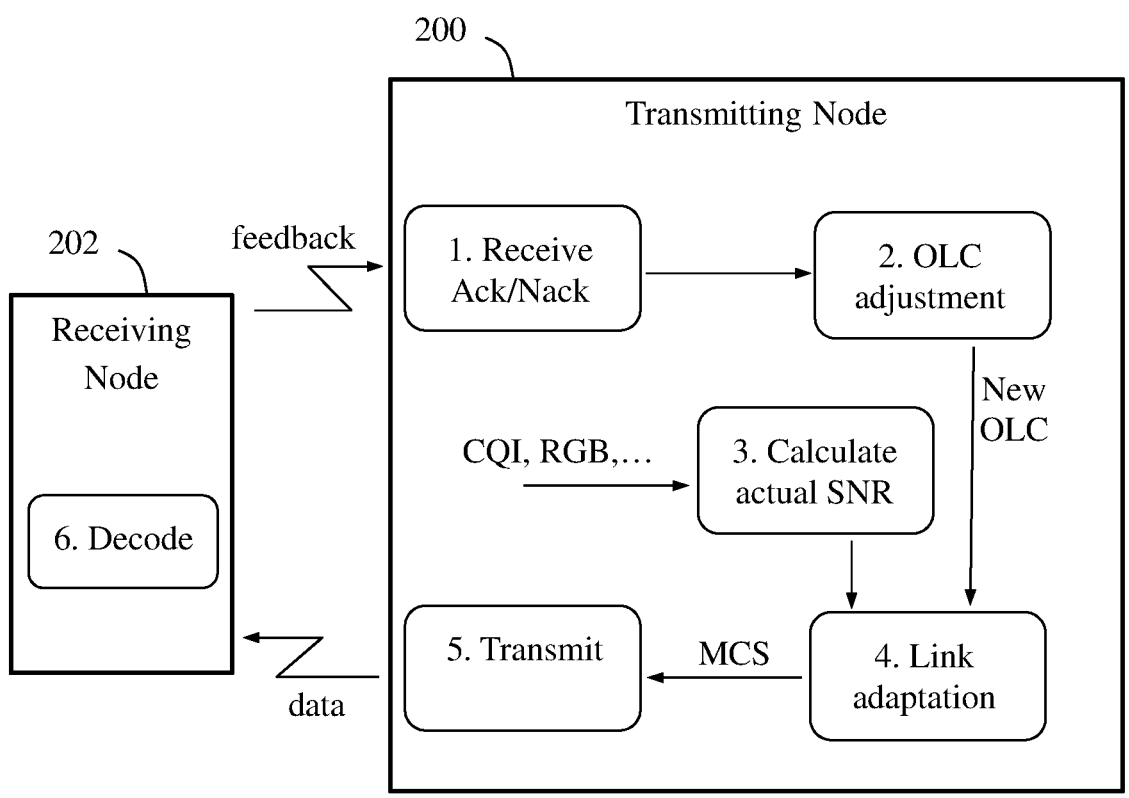
FIG. 2A illustrates an outer loop procedure in a transmitting node, which may be employed in the embodiments herein.

First, the process of link adaptation based on an outer loop will be described in some detail with reference to FIG. 2A which illustrates various operations in a transmitting node 200 which could be a network node performing downlink transmissions or a wireless device performing uplink transmissions. These operations may be employed to accomplish the OLC adjustment and link adaptation in the examples and embodiments described herein. The transmitting node 200 thus performs transmissions which are received by a receiving node 202 which could be a wireless device receiving downlink transmissions or a network node receiving uplink transmissions.

Link Adaptation (LA) of a downlink radio channel is typically based on the CQI reported from the wireless device, from which an actual SNR can be estimated. The actual SNR is then basically used to decide the necessary level of coding needed for achieving successful transmissions. This SNR estimation is most often enhanced by the usage of an outer loop, which uses HARQ feedback indicating success and failures of transmissions, to perform compensation. To know that the LA is close to optimal regarding throughput, a certain amount of failed transmissions is needed. The level of failed transmissions may be measured in terms of Block Error Rate, BLER.

The outer loop basically compensates for a target SNR determined for the transmission. In general, a high target SNR can be used for services primarily requiring high quality while a lower target SNR can be used for services primarily requiring high throughput. The outer loop is a function to use the actual outcome of a previous transmission, herein denoted actual SNR, to compensate for the difference relative to the target SNR as follows:

$$\text{target SNR} = \text{actual SNR} + \text{OLC} \quad (1)$$

The actual SNR can be calculated based on measurements of received signal strength reported by the receiving node, such as CQI reported from a wireless device or SINR or received power reported from a network node. The actual SNR is dependent on various factors which may include one or more of: CQI or SINR or received power, a currently used Resource Group Block RGB, a Transport Block Size TBS, a currently used MCS, etc. Thus, the actual SNR=f(CQI, RGB, TBS, MCS, . . . ). The calculation of the actual SNR for a transmission received at the receiving node can be made according to any regular procedure which is not necessary to describe in any detail.

Figure 2B:
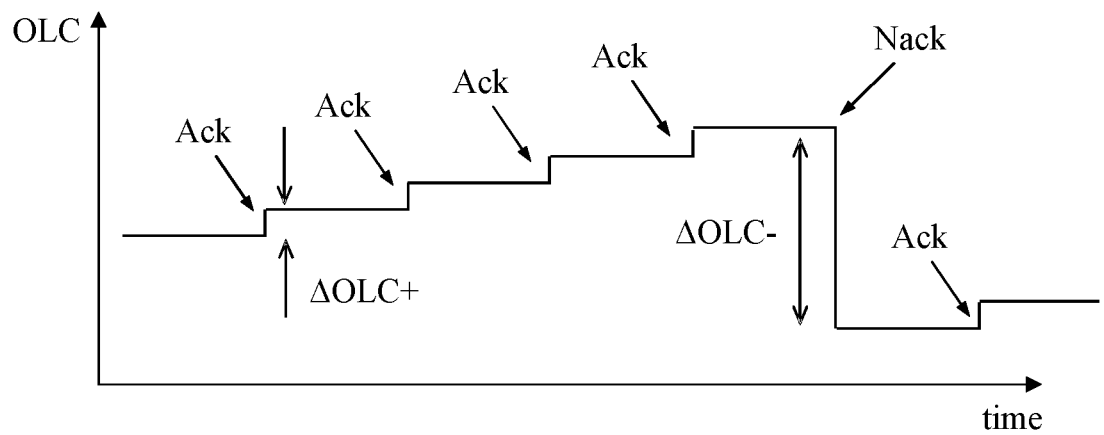
FIG. 2B is a diagram illustrating how an Outer Loop Compensation, OLC, may be adjusted depending on feedback from a receiving node, which may be employed in the embodiments herein.

In LTE and upcoming 5G, the HARQ feedback of the transmission is used to adjust a compensation value, which is thus the above-mentioned OLC, by increasing the OLC of a previous transmission N with a predefined adding value $\Delta\text{OLC}+$ when an ACK is received and reducing the OLC with a predefined reducing value $\Delta\text{OLC}-$ when a NACK is received. Thereby, the OLC will describe a step-like curve over time which is illustrated in FIG. 2B. This adjustment of OLC for a next transmission N+1 can be described mathematically as:

$$\text{OLC}(N+1) = \text{OLC}(N) + \Delta\text{OLC}+, \text{ if ACK is received for transmission } N \quad (2)$$

$$\text{OLC}(N+1) = \text{OLC}(N) - \Delta\text{OLC}-, \text{ if NACK is received for transmission } N \quad (3)$$

Typically, the reducing value $\Delta\text{OLC}-$ is considerably larger than the adding value $\Delta\text{OLC}+$, which can also be seen in FIG. 2B.

The following operations 1-5 are performed by the transmitting node 200 when employing an outer loop for link adaptation. Initially, it is assumed that the transmitting node 200 has performed a transmission towards the receiving node 202 and is expecting feedback from the receiving node 202 in the form of an ACK or a NACK for the transmission according to the above-described HARQ process.

1. The transmitting node 200 receives an ACK or a NACK as feedback on a foregoing transmission.

2. Depending on whether an ACK or a NACK was received, the transmitting node 200 adjusts the current value of OLC, that is by increasing the OLC when ACK and reducing it when NACK.

3. The transmitting node 200 obtains, e.g. calculates, the actual SNR which may be dependent on CQI, RGB, TBS, MCS, . . . as mentioned above.

4. The transmitting node 200 performs link adaptation based on the actual SNR and the adjusted OLC and the formula (1), which means basically that a suitable MCS is selected for the next transmission. For example, if actual SNR+OLC is lower than the used target SNR, it is necessary to use a more robust MCS to increase the actual SNR to satisfy the target SNR in (1). On the other hand, if actual SNR+OLC is significantly higher than the target SNR, it is possible to reduce the actual SNR by using a less robust MCS while still satisfying the target SNR in (1).

5. The transmitting node 200 performs the next transmission using the MCS selected in the link adaptation.

6. The receiving node 202 receives the transmission and attempts to decode it and will then return ACK or NACK as feedback on the transmission to the transmitting node 200.

Operations 1-6 will be repeated for each transmission, referred to as the outer loop, and the OLC used in (1) as a basis for link adaptation will be adjusted at the transmitting node 200 basically in the manner illustrated in FIG. 2B.

As indicated above, when an outer loop is employed for link adaptation of a currently used first service, the solution suggests to use another outer loop for link adaptation of a second service having different requirements than the first service, so that the link adaptation is prepared for the second service once it is activated and starts to be used. This implies that a first OLC is employed in a first link adaptation for transmissions in the first service and a second OLC can be employed in a second link adaptation for transmissions in the second service. The second link adaptation is developed before the second service has been activated, based on feedback on a repeated subset of the transmissions in the first service.

In the following examples, it is assumed that the first service requires relatively high quality and relatively low throughput, and that the second service requires higher throughput and less quality than the first service, although the solution is not limited to such a distinction of the first and second services.

An example of various operations in a transmitting node 300 to accomplish the above dual outer loops in communication with a receiving node 302, will now be described with reference to FIG. 3, where the transmitting node 300 could likewise be a network node performing downlink transmissions or a wireless device performing uplink transmissions. A first operation 3:1 illustrates that the transmitting node 300 receives ACK or NACK from the receiving node 302 as feedback on a foregoing transmission, as similar to operation 1 in FIG. 2A.

A next operation 3:2 illustrates that the received feedback is used in a first outer loop employed for transmissions in the first service, for which a first adding value $\Delta OLC+1$ and a first reducing value $\Delta OLC-1$ have been defined for adjustment of a first OLC used in the first outer loop. Another operation 3:3 illustrates that some of the received feedback related to a repeated subset of the transmissions in the first service, is used in a second outer loop employed in preparation for transmissions in the second service. For the second outer loop, a second adding value $\Delta OLC+2$ and a second reducing value $\Delta OLC-2$ have been defined for adjustment of a second OLC used in the second outer loop.

The first outer loop of operation 3:2 produces a first link adaptation LA1 (including a suitable MCS) based on the feedback on regular transmissions in the first service, and LA1 is used for transmissions in the first service, as illustrated in an operation 3:4. The second outer loop of operation 3:3 produces a second link adaptation LA2 (including a suitable MCS) based on the feedback on the repeated subset of the transmissions in the first service, and LA2 is used for repeating every nth transmission in the first service, as illustrated in an operation 3:4A, where n can be any integer larger than 1.

The repeated transmissions in the first service as of operation 3:4A are thus used as a basis for the second outer loop and the resulting second link adaptation LA2, illustrated as dashed arrows, while at the same time the regular transmissions in the first service as of operation 3:4 are used as a basis for the first outer loop and the resulting first link adaptation LA1, illustrated as full arrows. Thereby, the first link adaptation LA1 can be tailored to meet the requirements of the first service and the second link adaptation LA2 can also be tailored to meet the requirements of the second service independent of the first link adaptation LA1. It is thus an advantage that transmissions in both services can be optimized individually, e.g. in terms of required performance and efficiency such as resource utilization. Another advantage is that the second link adaptation LA2 can be developed and prepared prior to activation of the second service, which provides for efficient usage of the second service once it starts.

An example of how the solution may be employed in terms of actions performed by a transmitting node such as the transmitting node 300, is illustrated by the flow chart in FIG. 4, which will now be described with further reference to FIG. 3. The actions in FIG. 4 are thus performed by the transmitting node 300 for handling transmissions to a receiving node 302 in a first service and in a second service over a radio channel where feedback signaling is employed to indicate either an acknowledgement, ACK, or a non-acknowledgement, NACK, of correct reception of the transmissions.

A first action 400 illustrates that the transmitting node 300 adjusts a first OLC for the first service, based on feedback signaling from the receiving node 302 for the transmissions in the first service. This adjusting is made by increasing the first OLC with a first adding value $\Delta OLC+1$ when an ACK is received and reducing the first OLC with a first reducing value $\Delta OLC-1$ when a NACK is received. This action corresponds at least partly to the above-described operation 3:2 and the formulas (2) and (3), respectively.

In a next action 402, the transmitting node 300 performs a first link adaptation LA1 of the radio channel for transmissions in the first service based on an actual SNR of signals in the first service and the adjusted first OLC. Actions 400 and 402 basically correspond to operation 3:2. This link adaptation may be made by determining the actual SNR based on measurements of signals received on the radio link, and then evaluating whether the actual SNR satisfies a predefined target SNR according to the above formula (1). If the actual SNR is too low, a new MCS that provides higher SNR at the cost of greater resource usage is selected in LA1 and used in the next transmission. On the other hand, if the actual SNR is excessively high so that actual SNR+OLC is significantly larger than the target SNR, a new MCS that provides somewhat lower SNR and less resource usage can be selected in LA1 and used in the next transmission. If the actual SNR satisfies the target SNR according to formula (1), the first link adaptation LA1 may keep the same MCS as used in the forgoing transmission(s).

A further action 404 illustrates that the transmitting node 300 performs transmissions in the first service over the radio channel using the first link adaptation LA1, which corresponds to the above-described operation 3:4. As indicated by a dashed arrow, actions 400-404 are repeated n−1 times, until it is time to perform the next action 406 as follows.

Another action 406 thus illustrates that the transmitting node 300 repeats a subset of the transmissions in the first service, which may comprise repetition of every nth transmission where n is an integer larger than 1. These repeated transmissions are used in a second outer loop as described above for operations 3:3 and 3:4A.

In a next action 408, the transmitting node 300 adjusts a second OLC for the second service before the second service becomes active, based on feedback signaling from the receiving node 302 for said repeated subset of transmissions. This adjusting is made by increasing the second OLC with a second adding value $\Delta OLC+2$ when an ACK is received for the repeated transmission, and reducing the second OLC with a second reducing value $\Delta OLC-2$ when a NACK is received for the repeated transmission, i.e. according to formulas (2) and (3), respectively.

The transmitting node 300 then performs a second link adaptation LA2 of the radio channel, in another action 410, for transmissions in the second service based on said actual SNR and the adjusted second OLC. The second link adaptation LA2 is used in the second outer loop for the repeated subset of transmissions in the first service, as described above for operation 3:4A. If it is found in an action 412 that the second service has not yet been activated, the second link adaptation LA2 is still used only for the repeated subset of transmissions in the first service and the process is repeated by returning to action 400.

However, if the second service has been activated in action 412, the transmitting node 300 performs transmissions in the second service over the radio channel using the second link adaptation LA2 since the second service has become active, as illustrated by an action 414. The procedure may then basically be repeated to keep the first and second link adaptations LA1, LA2 up to date, although action 408 can be made based on feedback on transmissions in the second service.

As long as the second service is active and the second link adaptation LA2 can be made based on feedback on transmissions in the second service according to action 414, action 406 can be omitted. If there are ongoing transmissions in both the first and second services, it is no longer necessary to repeat any subset of transmissions in either of the first and second services and outer loops can be applied for the services independently. However, if the second service remains active and the first service becomes inactive, the procedure of FIG. 4 may be modified by handling the second service as described above for the first service, and vice versa. Thereby, it is possible to keep the first link adaptation LA1 up to date in the same way as the second link adaptation LA2 when the second service was inactive until Yes in action 412.

Some further examples of embodiments that may be employed in the above procedure in FIG. 4 will now be described. In one example embodiment, said subset of transmissions may comprise repetition of every nth transmission in the first service, where n is an integer larger than 1. As a result, the repeated transmissions of action 406 will be less frequent than the original or regular transmissions of action 404. As a non-limiting example, n may be 10 so that every tenth transmission in the first service is repeated using the second link adaptation LA2. The integer n may be chosen as a tradeoff between accurate second OLC and limited resource usage.

In another example embodiment, the first adding value $\Delta OLC+1$ may be smaller than the second adding value $\Delta OLC+2$ to achieve more robust link adaptation for the first service than for the second service. This may be desirable if the first service requires higher quality but less throughput than the second service, as in the examples herein. This embodiment means that the first OLC will be increased more slowly than second OLC after a series of ACKs and a larger actual SNR will typically be required to satisfy a given target SNR in formula (1).

Alternatively or additionally, another example embodiment may be that the first reducing value $\Delta OLC-1$ is larger than the second reducing value $\Delta OLC-2$, to likewise achieve more robust link adaptation for the first service than for the second service. This means that the first OLC will be reduced more rapidly than the second OLC after a NACK and a larger actual SNR will typically be required to satisfy the target SNR in formula (1). As indicated above, another example embodiment may be that the first service requires higher quality and less throughput than the second service.

In another alternative embodiment, the first and second adding values $\Delta OLC+1$ and $\Delta OLC+2$ may be zero to achieve robust link adaptation for both the first service and the second service, if desired.

In another example embodiment, the second link adaptation LA2 may be performed so that a predefined target SNR is met according to:

target SNR=actual SNR+second OLC, which has also been described above with reference to formula (1).

As also indicated above, another example embodiment may be that the first service requires higher quality and lower throughput than the second service, which means that it may be suitable in this case to use a higher target SNR for the first service than for the second service. When this embodiment is applied, further example embodiments may be that the first service involves communication of voice and/or video, e.g. in a real-time service such as a call or an interactive service requiring rapid responses. The second service may involve communication of data, e.g. in a downloading or uploading service which is not time-critical.

It was mentioned above that the transmitting node 300 repeats a subset of the transmissions in the first service in action 406, e.g. repeating every nth transmission. In this case, another example embodiment may be that each repeated transmission comprises the same sequence number of a used communication protocol as its original transmission. The communication protocol used may be the well-known Real Time Protocol, RTP, or any other available communication protocol depending on the implementation, where each transmission comprises an incremented sequence number so that the receiving node can keep track of the received transmissions.

In further example embodiments, the repeated transmission may comprise sequence numbers for Radio Link Control, RLC, and Packet Data Convergence Protocol, PDCP, which sequence numbers are incremented from the original transmission. However, the solution is not limited to any of the above-mentioned sequence numbers and protocols.

Figure 5A:
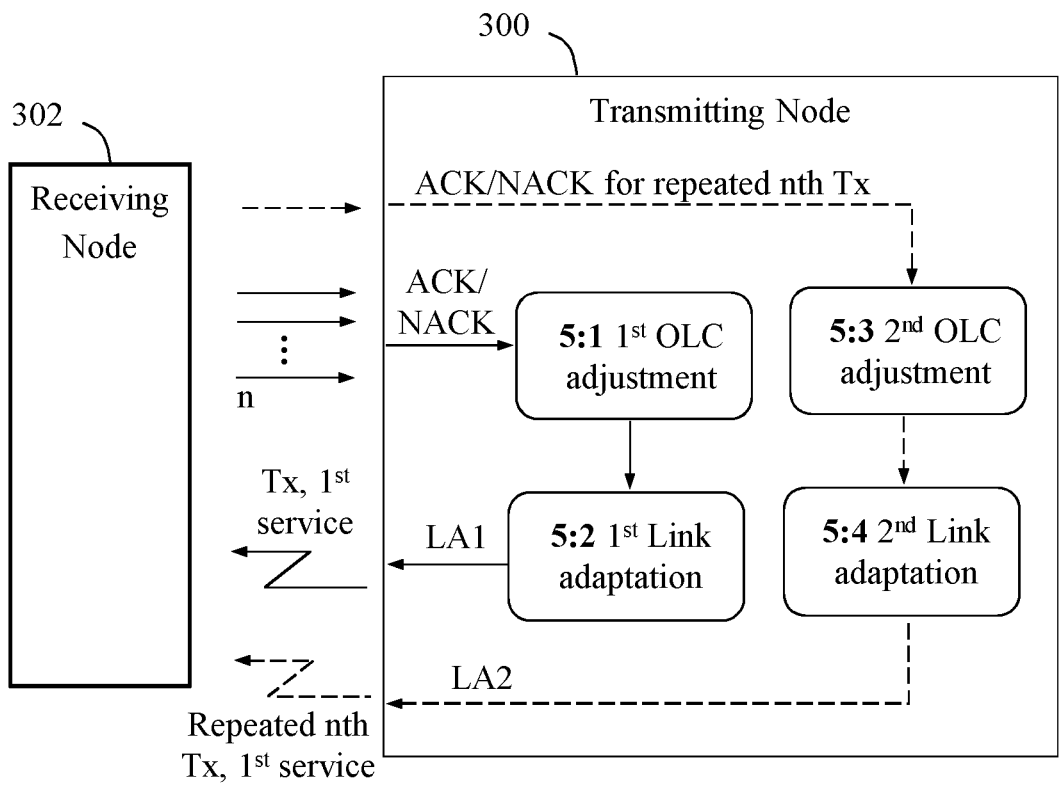
FIG. 5A is a block diagram illustrating an example of how a transmitting node may operate, according to further example embodiments.

A further example of operations in the transmitting node 300 to accomplish the above dual outer loops in communication with a receiving node 302 on a radio channel, is illustrated in FIG. 5A, which could be employed in conjunction with the operations shown in FIG. 3 as follows. The terminology used when describing FIG. 3 will also be used below when describing FIG. 5A. As in FIG. 3, the first outer loop in FIG. 5A is indicated by full lines and the second outer loop is indicated by dashed lines.

A first operation 5:1 illustrates that the transmitting node 300 adjusts the first OLC based on feedback, ACK or NACK, received from the receiving node 302 after each regular or original (i.e. non-repeated) transmission in the first service, in the manner described above for action 400. In a following operation 5:2, the transmitting node 300 performs a first link adaptation LA1 of the radio channel for transmissions in the first service based on an actual SNR of signals in the first service and the adjusted first OLC. This operation is performed in the manner described above for action 402. Operations 5:1 and 5:2 further correspond to operation 3:2. The first link adaptation LA1 is then used for transmissions in the first service, in the manner described above for action 404.

In another operation 5:3, the transmitting node 300 adjusts the second OLC based on feedback, ACK or NACK, received from the receiving node 302 after each repeated transmission in the first service, in the manner described above for action 408. In a following operation 5:4, the transmitting node 300 performs a second link adaptation LA2 of the radio channel based on an actual SNR of the repeated transmissions and the adjusted second OLC. This operation is performed in the manner described above for action 410. Operations 5:1 and 5:2 further correspond to operation 3:2. The second link adaptation LA2 is then used in the second outer loop for the repeated subset of transmissions in the first service, in the manner described above for operation 3:4A.

Figure 5B:
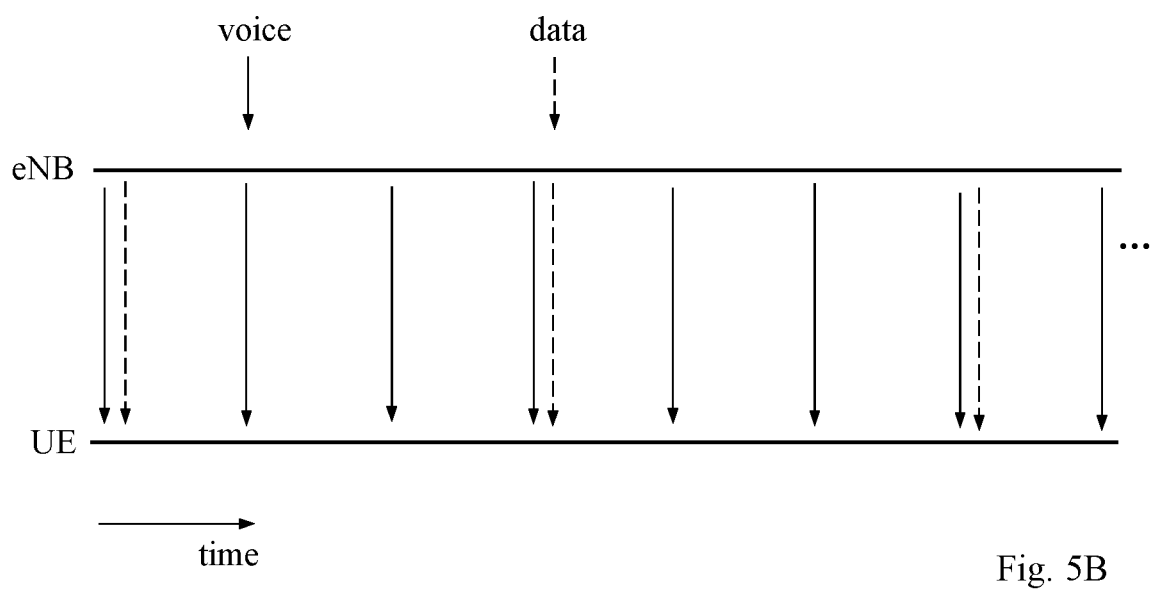
FIG. 5B is a time diagram illustrating an example of how a transmitting node may perform transmissions in a voice service and in a data service, when using at least some for the embodiments herein.

An example of how an eNB (transmitting node) may perform transmissions to a UE (receiving node) in an ongoing voice service and in preparation of a potentially forthcoming data service, is illustrated by the time diagram in FIG. 5B. The voice transmissions used for maintaining a voice outer loop are illustrated by full arrows and repeated transmissions used for maintaining a data outer loop are illustrated by dashed arrows. In this case, every third transmission is repeated so that n=3. The eNB uses a higher target SNR and more robust link adaptation for the regular data transmissions than for the repeated transmissions. It may be assumed that data transmissions may start at any point and the data outer loop can therefore be maintained in preparation thereof, based on the repeated transmissions.

Some further details and considerations of the above examples and embodiments will now be described.

If the link adaptation is set to create a very robust transmission, no failed transmissions (NACK) would occur. This results in a very conservative link adaptation, since success is always expected to occur and an increase of the OLC cannot be used. However, failures can still occur due to failed transmissions on the PDCCH or in the feedback channel, which will make the next transmission even more robust according to regular link adaptation. In practice, the link adaptation will in these cases create a very robust but also a very resource demanding channel with a low throughput. For example, this may result in a high cost in terms of resource usage, even for a service with low throughput demand. Another problem may occur if this radio channel is needed for communicating large data volumes, and such a service will experience very low throughput while consuming excessive amounts of resources.

In the embodiments herein, link adaptation is separated for different services using the same radio channel, e.g. in order to achieve a robust channel for a service needing robustness and a throughput optimized channel for a service needing high throughput.

Figure 6:
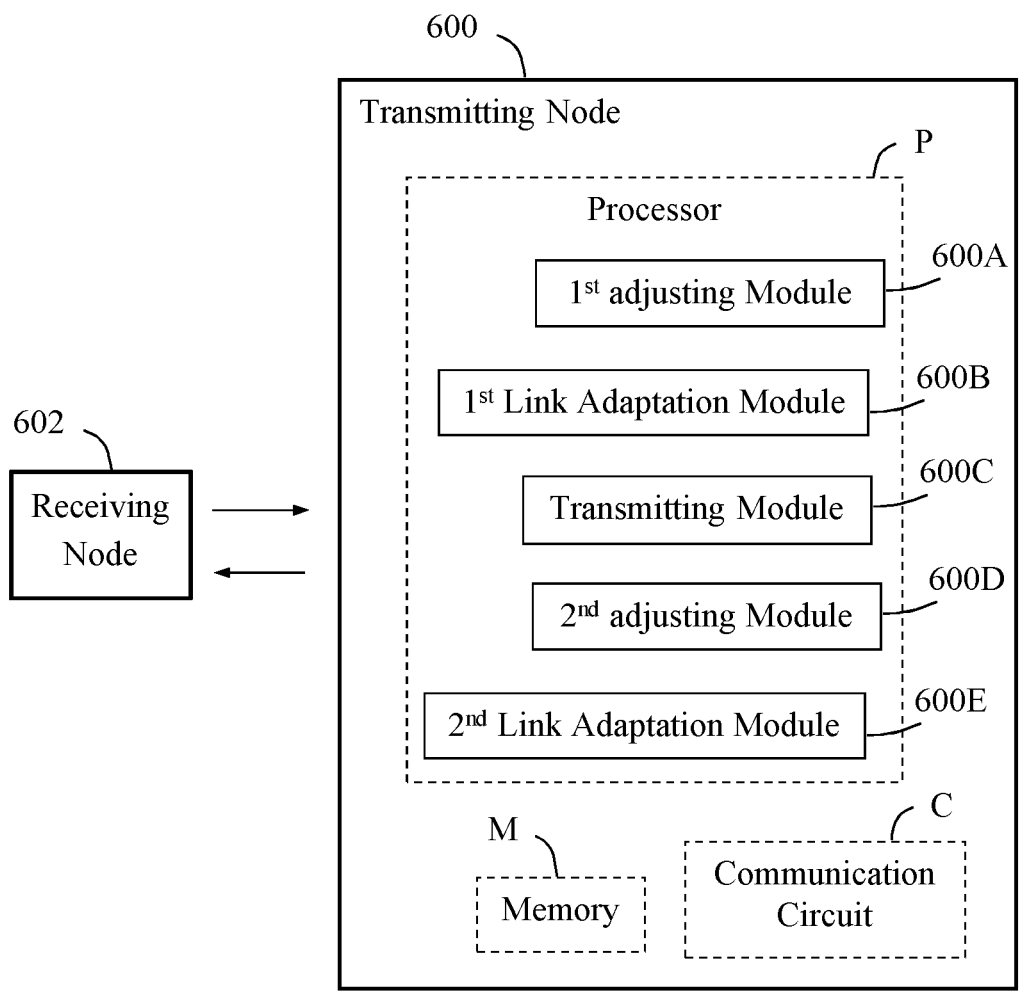
FIG. 6 is a block diagram illustrating how a transmitting node may be structured, according to further example embodiments.

The block diagram in FIG. 6 illustrates a detailed but non-limiting example of how a transmitting node 600 may be structured to bring about the above-described solution and embodiments thereof. The transmitting node 600 may be configured to operate according to any of the examples and embodiments for employing the solution as described herein, where appropriate and as follows. The transmitting node 600 is shown to comprise a processor P and a memory M, said memory comprising instructions executable by said processor whereby the transmitting node 600 is operable as described herein. The transmitting node 600 also comprises a communication circuit C with suitable equipment for performing transmissions and receiving feedback in the manner described herein.

Figure 3:
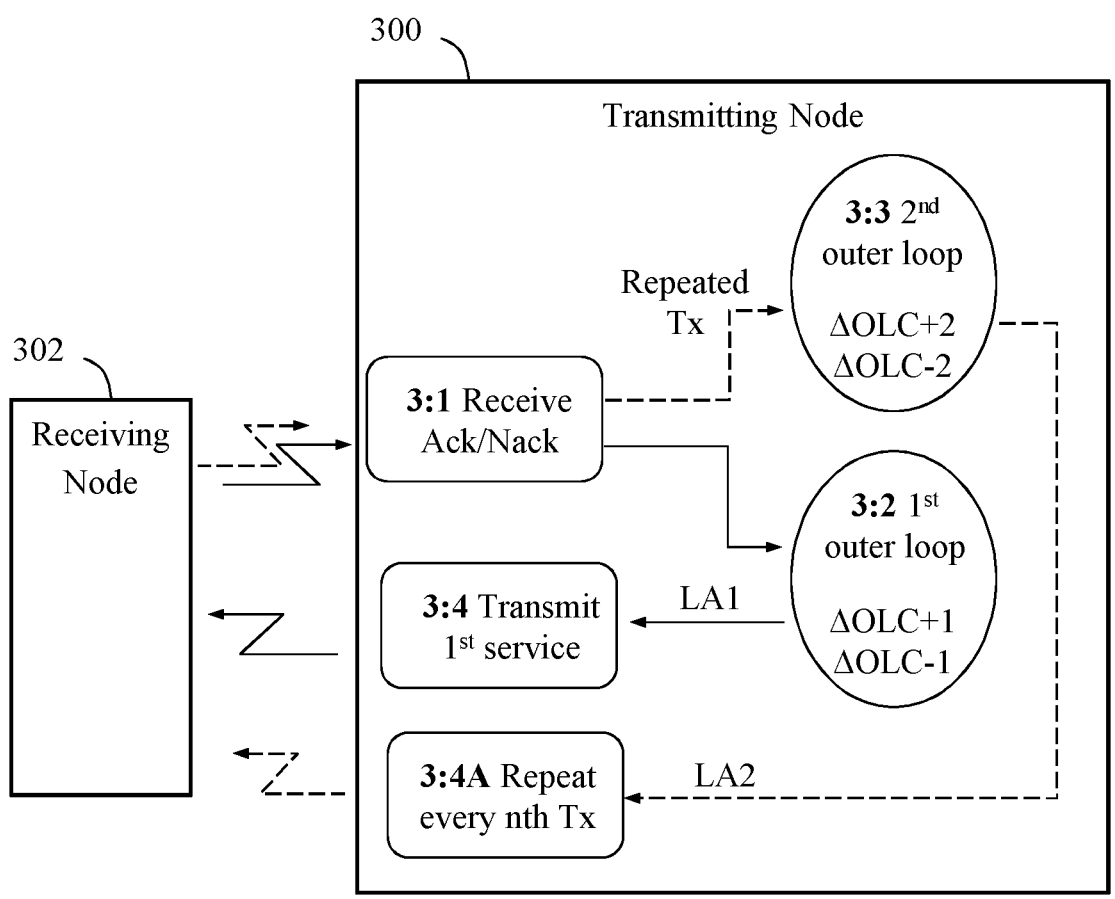
FIG. 3 is a communication scenario illustrating an example of how the embodiments herein may be used, according to some example embodiments.
Figure 4:
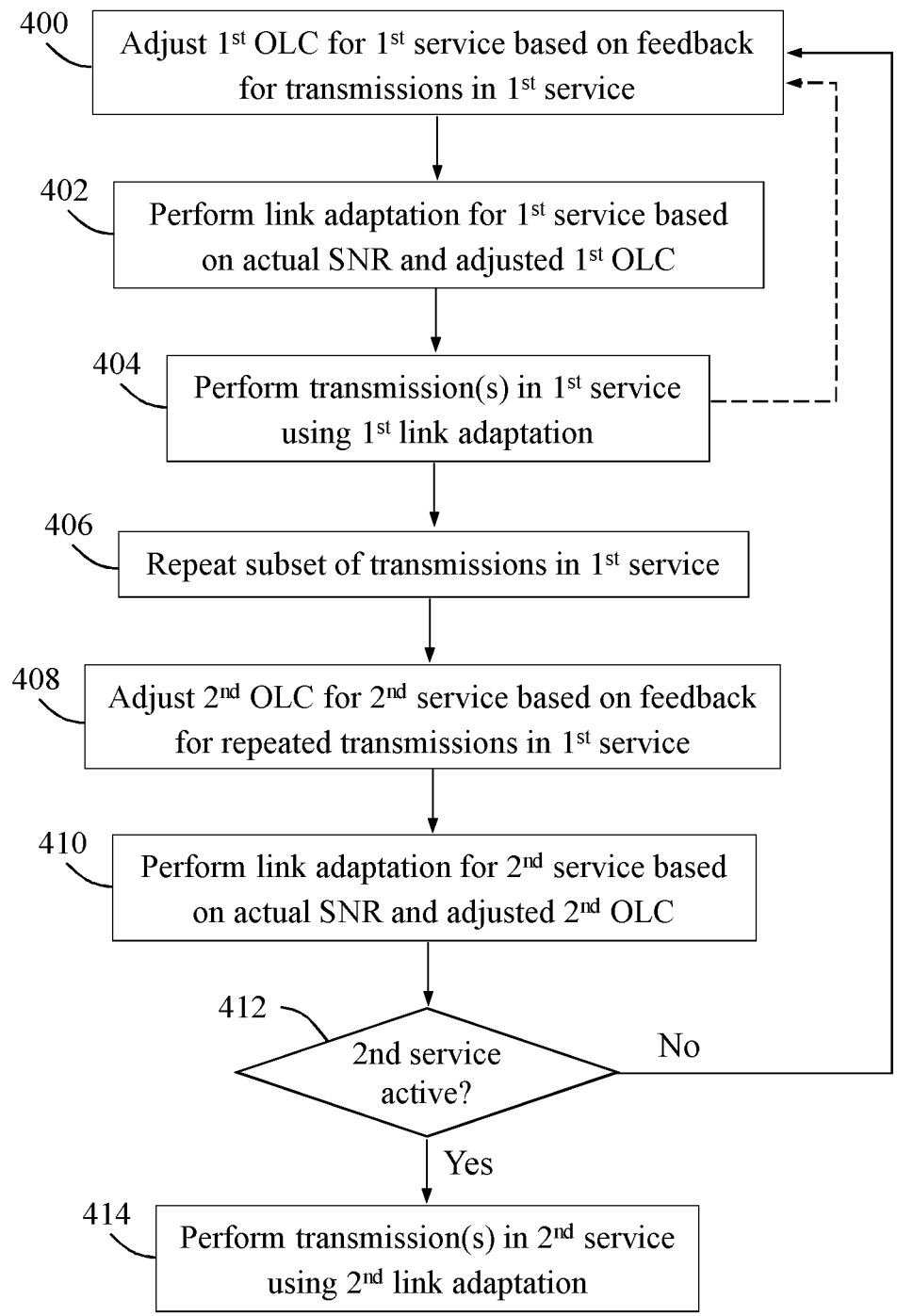
FIG. 4 is a flow chart illustrating a procedure in a transmitting node, according to further example embodiments.

The transmitting node 600 corresponds to the transmitting node 300 in FIG. 3. The communication circuit C may be configured for communication with a receiving node 602 corresponding to the receiving node 302 in FIG. 3, using suitable protocols and messages. Such communication may be performed over any suitable radio channels depending on the implementation, and the solution and embodiments herein are not limited to using any specific types of messages or protocols for communication.

The transmitting node 600 comprises means configured or arranged to basically perform at least some of the actions in FIG. 4, and more or less as described above for the transmitting node 300 in various examples and embodiments. In FIG. 6, the transmitting node 600 is arranged or configured to handle transmissions to a receiving node 602 in a first service and in a second service over a radio channel where feedback signaling is employed to indicate either an ACK or a NACK of correct reception of the transmissions, as follows.

The transmitting node 600 is configured to adjust a first OLC for the first service, based on feedback signaling from the receiving node for the transmissions in the first service, by increasing the first OLC with a first adding value $\Delta OLC+1$ when an ACK is received and reducing the first OLC with a first reducing value $\Delta OLC-1$ when a NACK is received. This adjusting operation may be performed by a first adjusting module 600A in the transmitting node 600, e.g. in the manner described above for action 400. The first adjusting module 600A could alternatively be named a first tuning module or modifying module.

The transmitting node 600 is further configured to perform a first link adaptation of the radio channel for transmissions in the first service based on an actual SNR of signals in the first service and the adjusted first OLC. This operation may be performed by a first link adaptation module 600B in the transmitting node 600, e.g. as described above for action 402. The first link adaptation module 600B could alternatively be named a first transmission controlling module or configuring module.

The transmitting node 600 is also configured to perform transmissions in the first service over the radio channel using the first link adaptation. This operation may be performed by a transmitting module 600C in the transmitting node 600, basically as described above for action 404. The transmitting node 600 is also configured to repeat a subset of the transmissions in the first service, as described above for action 406, which may be performed by the transmitting module 600C.

The transmitting node 600 is further configured to adjust a second OLC for the second service before the second service becomes active, based on feedback signaling from the receiving node for said repeated subset of transmissions, by increasing the second OLC with a second adding value $\Delta OLC+2$ when an ACK is received and reducing the second OLC with a second reducing value $\Delta OLC-2$ when a NACK is received. This adjusting operation may be performed by a second adjusting module 600D in the transmitting node 600, e.g. in the manner described above for action 408. The second adjusting module 600A could alternatively be named a second tuning module or modifying module.

The transmitting node 600 is further configured to perform a second link adaptation of the radio channel for transmissions in the second service based on said actual SNR and the adjusted second OLC. This operation may be performed by a second link adaptation module 600E in the transmitting node 600, e.g. as described above for action 410. The second link adaptation module 600B could alternatively be named a second transmission controlling module or configuring module.

The transmitting node 600 is also configured to perform transmissions in the second service over the radio channel using the second link adaptation, once the second service becomes active. This operation may be performed by the transmitting module 600C, basically as described above for action 414.

It should be noted that FIG. 6 illustrates various functional modules or units in the transmitting node 600, and the skilled person is able to implement these functional modules in practice using suitable software and hardware. Thus, the solution is generally not limited to the shown structures of the transmitting node 600, and the functional modules or units 600A-E therein may be configured to operate according to any of the features and embodiments described in this disclosure, where appropriate.

The functional modules or units 600A-E described above could thus be implemented in the transmitting node 600 by means of hardware and program modules of a computer program comprising code means which, when run by the processor P causes the transmitting node 600 to perform at least some of the above-described actions and procedures.

In FIG. 6, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the transmitting node 600 in the form of a memory having a computer readable medium and being connected to the processor P. The computer program product or memory in the transmitting node 600 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the transmitting node 600.

The solution described herein may thus be implemented in the transmitting node 600 by a computer program comprising instructions which, when executed on at least one processor, cause the at least one processor to carry out the actions according to any of the above embodiments and examples, where appropriate. The solution may also be implemented in a carrier containing the above computer program, wherein the carrier is one of an electronic signal, an optical signal, a radio signal, or a computer readable storage product or computer program product.

While the solution has been described with reference to specific exemplifying embodiments, the description is generally only intended to illustrate the inventive concept and should not be taken as limiting the scope of the solution. For example, the terms "transmitting node", "receiving node", "feedback signaling", "Outer Loop Compensation, OLC", "link adaptation", "adding value ΔOLC+" and "reducing value ΔOLC−" have been used throughout this disclosure, although any other corresponding entities, functions, and/or parameters could also be used having the features and characteristics described here. The solution is defined by the appended claims.

The invention claimed is:

1. A method performed by a transmitting node for handling transmissions to a receiving node in a first service and in a second service over a radio channel where feedback signaling is employed to indicate either an acknowledgement (ACK) or a non-acknowledgement (NACK) of correct reception of the transmissions, the method comprising:

adjusting a first Outer Loop Compensation (OLC) for the first service, based on feedback signaling from the receiving node for the transmissions in the first service, by increasing the first OLC with a first adding value ΔOLC+1 when an ACK is received and reducing the first OLC with a first reducing value ΔOLC−1 when a NACK is received, performing a first link adaptation (LA1) of the radio channel for transmissions in the first service based on an actual Signal-to-Noise Ratio, (SNR) of signals in the first service and the adjusted first OLC, performing transmissions in the first service over the radio channel using the first link adaptation, repeating a subset of the transmissions in the first service, adjusting a second OLC for the second service before the second service becomes active, based on feedback signaling from the receiving node for said repeated subset of transmissions, by increasing the second OLC with a second adding value ΔOLC+2 when an ACK is received and reducing the second OLC with a second reducing value ΔOLC-2 when a NACK is received, performing a second link adaptation (LA2) of the radio channel for transmissions in the second service based on said actual SNR and the adjusted second OLC, and performing transmissions in the second service over the radio channel using the second link adaptation, once the second service becomes active.

2. The method of claim 1, wherein said subset of transmissions comprises repetition of every nth transmission in the first service where n is an integer larger than 1.

3. The method of claim 1, wherein the first adding value ΔOLC+1 is smaller than the second adding value ΔOLC+2 to achieve more robust link adaptation for the first service than for the second service.

4. The method of claim 1, wherein the first reducing value ΔOLC−1 is larger than the second reducing value ΔOLC-2 to achieve more robust link adaptation for the first service than for the second service.

5. The method of claim 3, wherein the first service requires higher quality and less throughput than the second service.

6. The method of claim 1, wherein the first and second adding values ΔOLC+1 and ΔOLC+2 are zero to achieve robust link adaptation for both the first service and the second service.

7. The method of claim 1, wherein the second link adaptation is performed so that a predefined target SNR is met according to:

target SNR=actual SNR+second OLC.

8. The method of claim 1, wherein the first service requires higher quality and lower throughput than the second service.

9. The method of claim 8, wherein the first service involves communication of voice and/or video and the second service involves communication of data.

10. The method of claim 1, wherein each repeated transmission comprises the same sequence number of a used communication protocol as its original transmission.

11. The method of claim 10, wherein the repeated transmission comprises sequence numbers for Radio Link Control, (RLC) and Packet Data Convergence Protocol (PDCP), which sequence numbers are incremented from the original transmission.

12. A transmitting node arranged to handle transmissions to a receiving node in a first service and in a second service over a radio channel where feedback signaling is employed to indicate either an acknowledgement, (ACK) or a non-acknowledgement (NACK) of correct reception of the transmissions, wherein the transmitting node is configured to:
- adjust a first Outer Loop Compensation (OLC) for the first service, based on feedback signaling from the receiving node for the transmissions in the first service, by increasing the first OLC with a first adding value $\Delta OLC+1$ when an ACK is received and reducing the first OLC with a first reducing value $\Delta OLC-1$ when a NACK is received,
- perform a first link adaptation (LA1) of the radio channel for transmissions in the first service based on an actual Signal-to-Noise Ratio (SNR) of signals in the first service and the adjusted first OLC,
- perform transmissions in the first service over the radio channel using the first link adaptation,
- repeat a subset of the transmissions in the first service,
- adjust a second OLC for the second service before the second service becomes active, based on feedback signaling from the receiving node for said repeated subset of transmissions, by increasing the second OLC with a second adding value $\Delta OLC+2$ when an ACK is received and reducing the second OLC with a second reducing value $\Delta OLC-2$ when a NACK is received,
- perform a second link adaptation (LA2) of the radio channel for transmissions in the second service based on said actual SNR and the adjusted second OLC, and
- perform transmissions in the second service over the radio channel using the second link adaptation, once the second service becomes active.

13. The transmitting node of claim 12, wherein said subset of transmissions comprises repetition of every nth transmission in the first service where n is an integer larger than 1.

14. The transmitting node of claim 12, wherein the first adding value $\Delta OLC+1$ is smaller than the second adding value $\Delta OLC+2$ to achieve more robust link adaptation for the first service than for the second service.

15. The transmitting node of claim 12, wherein the first reducing value $\Delta OLC-1$ is larger than the second reducing value $\Delta OLC-2$ to achieve more robust link adaptation for the first service than for the second service.

16. The transmitting node of claim 12, wherein the first and second adding values $\Delta OLC+1$ and $\Delta OLC+2$ are zero to achieve robust link adaptation for both the first service and the second service.

17. The transmitting node of claim 12, wherein the transmitting node is configured to perform the second link adaptation so that a predefined target SNR is met according to: target SNR=actual SNR+second OLC.

18. The transmitting node of claim 12, wherein
- the first service requires higher quality and lower throughput than the second service, and
- the first service involves communication of voice and/or video and the second service involves communication of data.

19. The transmitting node of claim 12, wherein
- each repeated transmission comprises the same sequence number of a used communication protocol as its original transmission, and
- the repeated transmission comprises sequence numbers for Radio Link Control (RLC) and Packet Data Convergence Protocol (PDCP), which sequence numbers are incremented from the original transmission.

20. A computer program product comprising a non-transitory computer readable medium storing a computer program comprising instructions which, when executed on at least one processor, cause the at least one processor to carry out the method of claim 1.

* * * * *